Sept. 18, 1945. A. J. MIDDLER 2,384,950
NONDEAD CENTERING CRANK ACTUATING MECHANISM
Filed Dec. 4, 1944 2 Sheets-Sheet 2
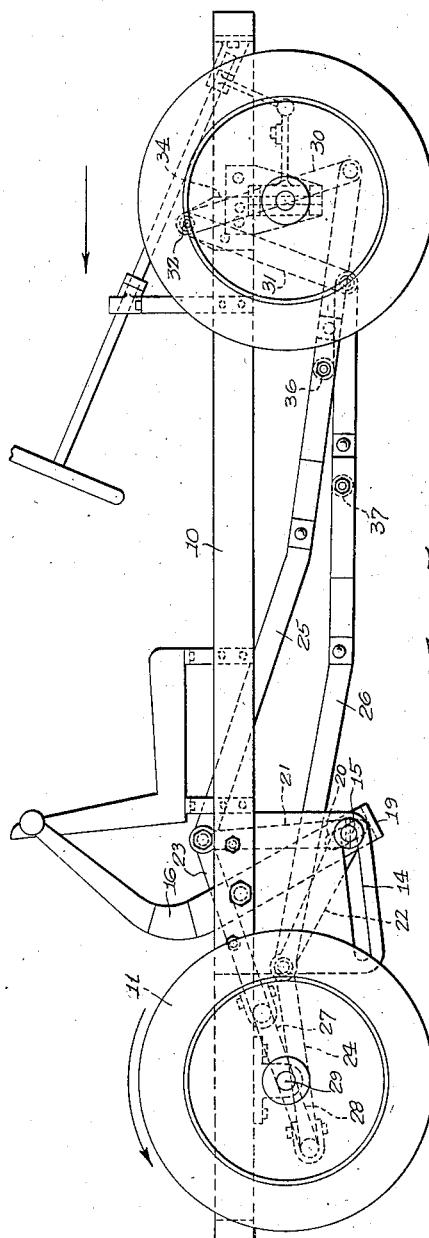
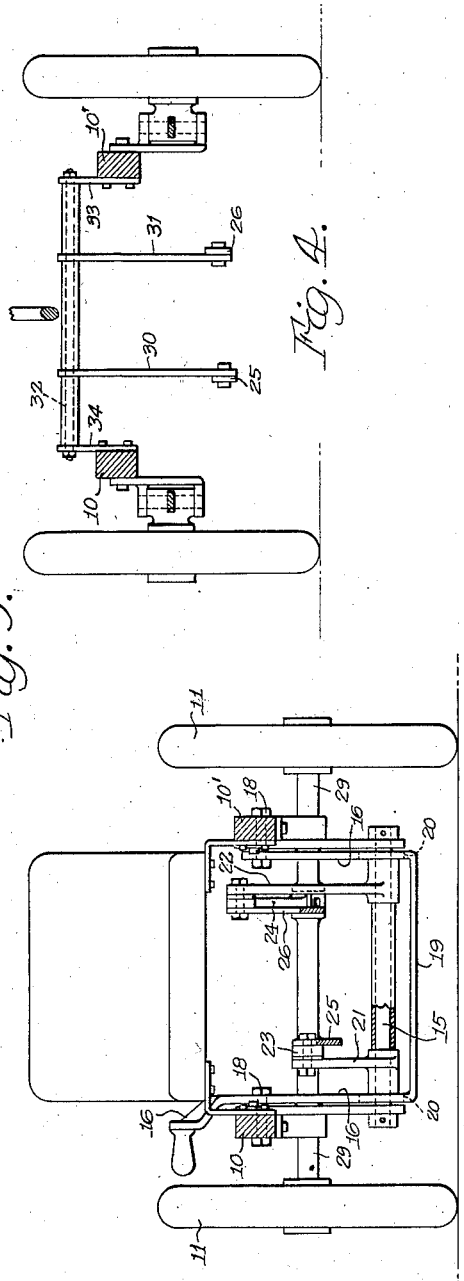
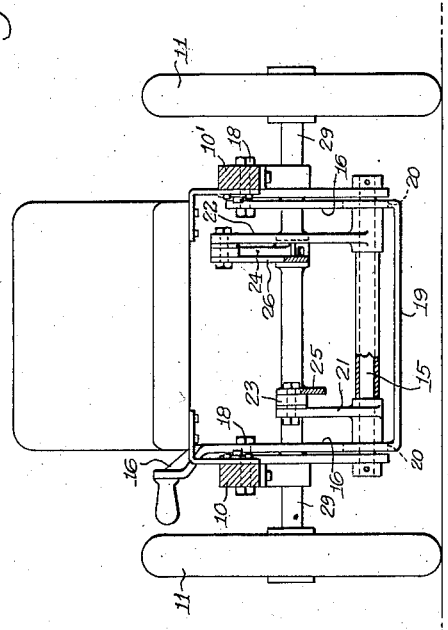
Inventor
Alexander J. Middler
By Thomas J. Hughes
Attorney Patented Sept. 18, 1945

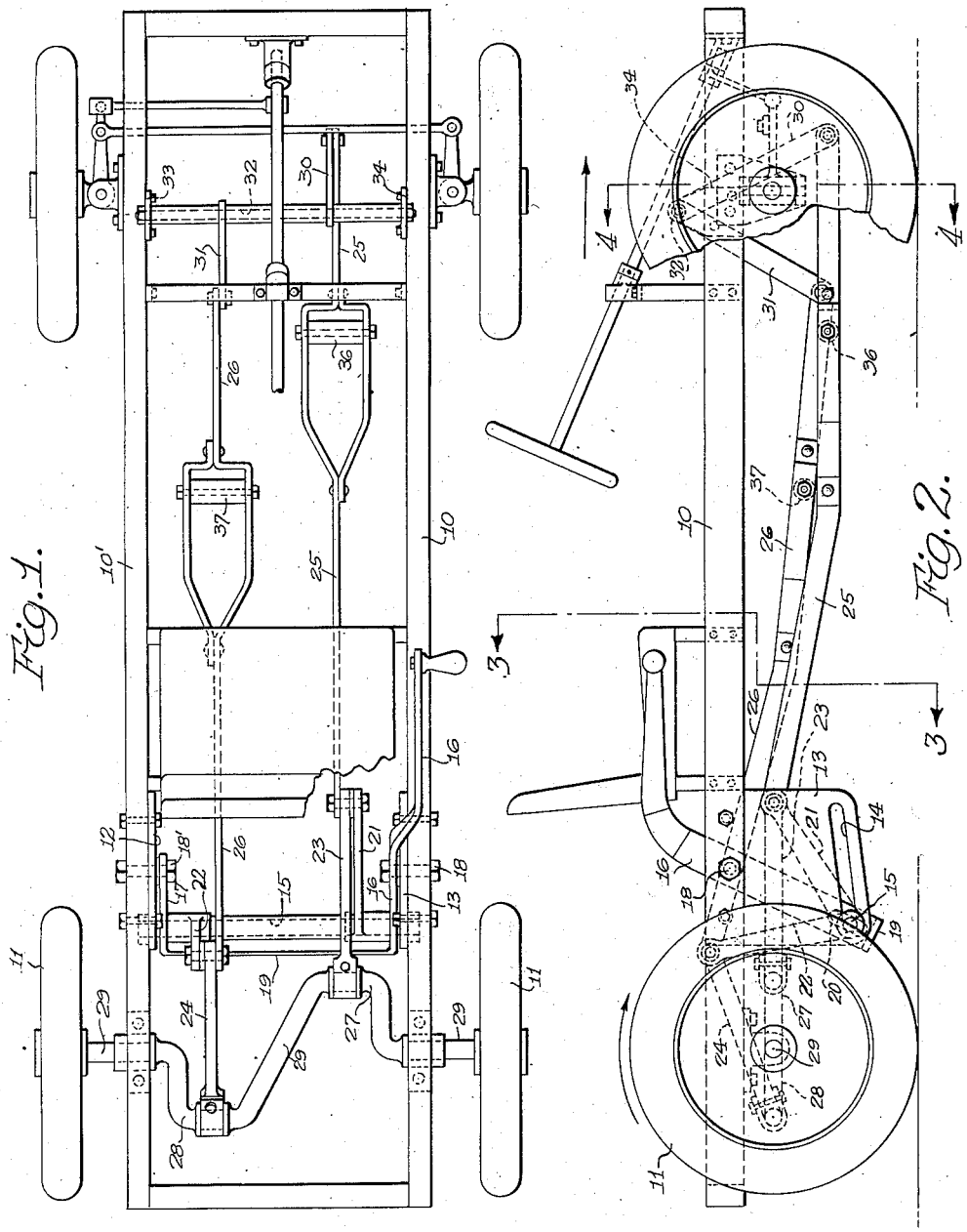

2,384,950

UNITED STATES PATENT OFFICE 2,384,950

NONDEAD CENTERING CRANK ACTUATING MECHANISM

Alexander J. Middler, Detroit, Mich.

Application December 4, 1944, Serial No. 566,594

15 Claims. (Cl. 280—237)

My invention relates to a crankshaft actuating mechanism and has particular reference to the means employed for transmitting power to a single plane two-throw crankshaft whereby the latter may be readily rotated in either direction.

The object of the invention is to provide a single plane two-throw crankshaft having two connecting rods, one journaled to each of said crank throws, means to alternately apply a longitudinal force to said connecting rods, means whereby said alternately applied force to said connecting rods will supply a continuous turning moment to said crank throughout 360 degrees of rotation, and additional means whereby said rotative turning moment applied by said connecting rods can readily be made to cause rotation of the crankshaft in both directions.

A further object of the invention is to provide a vehicle, of the type employed by juveniles, for purposes of transportation, with a single plane two-throw crankshaft as the driving medium for the vehicle, wherein movement of the vehicle in either forward or rearward direction is accomplished by the feet of the driver by pressure upon a pair of pedals without having to resort to the pushing of the vehicle, as by the foot on the ground or floor, in order to initiate such movement.

Fig. 1 is a plan view of the frame and wheels of a juvenile's automobile showing the application thereto of my invention for forward movement of the vehicle;

Fig. 2 is a side elevation of the construction shown in Fig. 1;

Fig. 3 is a cross sectional view taken on the line 3—3 of Fig. 2;

Fig. 4 is a cross-sectional view taken on the line 4—4 of Fig. 2;

Fig. 5 is a side elevation of the construction shown in Fig. 1, illustrating the crank control mechanism positioned for rearward travel of the vehicle.

Referring to the drawings, the numerals 10 and 10' designate the side frame members of the vehicle. Attached to each of said members adjacent the rear wheels 11 of the vehicle are brackets 12 and 13, each of said brackets having a similarly disposed slot 14, said slots providing a definite path for reciprocating travel therein for the ends of a cross shaft 15 carried by the swinging levers 16 and 17 pivotally mounted respectively at 18 and 18' on the side frames 10 and 10', the pivot points of said levers being disposed directly opposite each other. Interposed between the ends of said levers and adjacent the shaft 15 is a brace bar 19 so that upon actuation of the hand lever 16, it and its companion lever 17 will reciprocate in unison. The levers 16 and 17, adjacent the bar 19 are provided with apertures 20 through which the ends of the shaft 15 extend to engage the slots 14 aforesaid, said apertures being elongated axially of the said levers to permit vertical movement therein of the shaft 15, upon the reciprocating action of the latter.

Spacedly mounted upon said shaft 15, for pivotal movement relative thereto, are a pair of rocker arms 21 and 22, the opposite ends of which pivotally engage one end respectively of the connecting rods 23 and 24 as well as one end respectively of pedal arm members 25 and 26. The opposite ends of the rods 23 and 24 are journaled respectively to the opposed cranks 27 and 28 formed in the rear axle shaft 29 upon which either or both of the wheels 11 may be fixedly mounted to turn therewith.

The forward respective ends of the pedal members 25 and 26 pivotally engage the rocker arms 30 and 31 carried by the traverse shaft 32, said shaft being suitably mounted in brackets 33 and 34 bolted to the vehicle side frames 10 and 10'. Each of said pedal members is provided with a foot rest 36 and 37.

The arms 21 and 22 and the rods 23 and 24 are so proportioned with respect to each throw 27 and 28 of the shaft 29 that upon actuation of the levers 16 and 17, with the resultant forward or rearward movement of the shaft 15 in the slots 14, the pivotal points of contact of each pair of said arms and said rods are so changed in position relative to the axis of rotation of the crankshaft 29 that the thrusts (alternately imposed upon the crank throws 27 and 28, by actuation of the pedal members, through said rods) result either in a clockwise or a counterclockwise rotation of the crankshaft 29. Thus, when the shaft 15 is positioned rearwardly in the slots 14 (Fig.2) the said crankshaft, upon actuation of the pedal members, rotates in a clockwise direction by reason of the fact that the distance between the axis of said crankshaft 29 and said shaft 15 has been considerably reduced and consequently said pivotal points alternately describe an arc from a point slightly rearward of a vertical radius with the shaft 15 to a point substantially forward of such radius. In other words, upon actuation of the pedal members, the alternately elevated position of each of said pivotal points, in relation to the shaft 15 provides, through the said rods, a resultant force exerting an upward thrust alternately upon each of the respective crank throws 27 and 28 to accomplish the aforesaid clockwise rotation.

When the shaft 15 is positioned forwardly in the slots 14 (Fig. 5), the crankshaft 29 rotates in a counterclockwise direction by reason of the fact that the distance between the axis of said crankshaft and that of the shaft 15 has been considerably increased and therefore the aforesaid pivotal points alternately describe an arc starting from a point substantially rearward of the vertical radius with the shaft 15 to a point nearly on the vertical radius with said shaft. Now upon actuation of the pedal members 25 and 26 the alternately lowered arcuate position of each of said pivotal points, in relation to the shaft 15, provides, through the said rods a resultant force exerting a downward thrust alternately upon each of the respective crank throws 27 and 28 to accomplish the aforesaid counterclockwise rotation.

I claim:

1. In a pedal propelled vehicle, a single plane two-throw crankshaft having wheels mounted thereon, pedal members and rods operatively connected with said crankshaft and rockably supported upon arms carried by a shaft and means for shifting the latter.

2. In a pedal propelled vehicle, a single plane two-throw crankshaft having wheels mounted thereon, pedal members and rods operatively connected with said crankshaft and rockably supported upon arms carried by a shaft, and a lever operatively connected to said shaft for reciprocating the latter.

3. In a pedal propelled vehicle, a single plane two-throw crankshaft having wheels mounted thereon, pedal members, rods and arms having common pivots, said rods being operatively connected to said crankshaft, a shaft upon which said arms are rockably supported and a lever operatively connected to said shaft for reciprocating the latter.

4. In a pedal propelled vehicle, a single plane two-throw crankshaft having wheels mounted thereon, means for rotating said shaft comprising a connecting rod journaled to each crank throw and pedal members pivotally engaging said rods, means for reversing the direction of rotation of said shaft comprising a lever controlled shaft carrying arms for pivotal movement about their ends of the said members and rods.

5. In a pedal propelled vehicle, a single plane two-throw crankshaft having wheels mounted thereon, means for actuating said shaft comprising pedal members pivoted to rods connected to said shaft and means for rotating said crankshaft in a clockwise or counterclockwise direction comprising a lever controlled shaft and arms carried thereby for pivotal connection with said members and said rods.

6. In a pedal propelled vehicle, a single plane two-throw crankshaft having wheels mounted thereon, rods operatively connected to each of the crank throws, pedal members operatively connected to the other ends of said rods, arms carried by a shaft having their opposite ends connected with and providing pivot points for the meeting ends of said members and said rods, and means for shifting said shaft whereby the positions of said pivot points are varied with relation to said throws.

7. In a pedal propelled vehicle, a single plane two-throw crankshaft having wheels mounted thereon, rods journaled to each crank throw, actuating members pivotally connected to the other ends of said rods, arms carried by a shaft and having their opposite ends pivotally engaging said rods and said members, a lever operatively connected to said shaft for reciprocating the latter whereby the relative positions of said pivotal connections to the crank throws may be varied.

8. In a pedal propelled vehicle, a single plane two-throw crankshaft having wheels mounted thereon, rods journaled on each throw of said crankshaft, actuators pivoted to said rods, arms carried by a shaft and rockably supporting said actuators and said rods, and means for shifting said shaft to change the angular relationship of said rods and said throws whereby the rotative turning moment applied to said throws by said rods may be selectively controlled.

9. In a pedal propelled vehicle, a single plane two-throw crankshaft having wheels mounted thereon, actuating members for each crank throw, rods operatively interposed between said members and said throws, a shaft disposed transversely of the vehicle chassis, arms rockably supported upon said transverse shaft and pivoted to said members and said rods, and means for shifting said transverse shaft to vary the position thereof relative to the axis of the crankshaft.

10. In a pedal propelled vehicle, a single plane two-throw crankshaft having wheels mounted thereon, actuating members for each crank throw, rods operatively interposed between said members and said throws, a shaft disposed transversely of the vehicle chassis, arms rockably supported upon said transverse shaft and pivoted to said members and said rods, and means for shifting said transverse shaft to vary the angular positions of said members and said rods.

11. In a pedal propelled vehicle, a single plane two-throw crankshaft having wheels mounted thereon, pedal members and rods operatively connected with said crankshaft for actuating same, rocker arms carried by a shaft and pivotally connected to said members and rods, a lever for shiftably actuating the latter mentioned shaft to alternately increase or decrease the angular relationship between said pedal members and said rods.

12. In a pedal propelled vehicle, a single plane two-throw crankshaft, actuating members for each crank throw, rods operatively interposed between said members and said throws, a shaft disposed transversely of the vehicle chassis, arms rockably supported upon said transverse shaft and pivoted to said rods and means for shifting said transverse shaft to reverse the rotative turning of said crankshaft.

13. In a pedal propelled vehicle, a single plane two-throw crankshaft having wheels mounted thereon, a shaft disposed transversely of the vehicle, rocker arms carried by the said shaft, rods pivotally connected to said arms and journaled to each throw of said crankshaft, means for varying the position of said pivotal connection relative to the axis of rotation of said crankshaft, and means pivotally engaging said arms and said rods for swingably actuating the same to rotatably turn the said crankshaft.

14. In a pedal propelled vehicle, a single plane two-throw crankshaft having wheels mounted thereon, rods and pedal members successively operatively connected to each throw of said shaft, arms operatively supporting said rods and said members, a shaft upon which said arms are mounted for pivotal movement thereon, a lever for shifting said last mentioned shaft whereby the rotative turning moment of said throws can be directionally reversed.

15. In a pedal propelled vehicle, a single plane two-throw crankshaft having wheels mounted thereon, a shaft disposed substantially parallel to the axis of said crankshaft, means for varying the axial distance between said shafts including a lever for reciprocating said shaft, arms rockably supported upon the latter and a rod operatively connected at one end to each throw of said crankshaft and at the other to said arms, pedal members pivotally connected at one end to said arms and rockably supported at their opposite ends by arms carried by a shaft disposed transversely of the vehicle.

ALEXANDER J. MIDDLER.